US012717454B2

(12) United States Patent
Kim et al.

(10) Patent No.: US 12,717,454 B2
(45) **Date of Patent: *Aug. 25, 2026**

(54) ELECTRONIC DEVICE, COVER DEVICE, AND CONTROL METHOD FOR RECOGNIZING SIGNALS AND CONTROLLING A DISPLAY MODULE OF ELECTRONIC DEVICE

(71) Applicant: Samsung Electronics Co., Ltd., Gyeonggi-do (KR)

(72) Inventors: Kyeongho Kim, Gyeonggi-do (KR); Kyungmoon Kang, Gyeonggi-do (KR); Changbyung Park, Gyeonggi-do (KR); Jiwoo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,514

(22) Filed: Nov. 13, 2024

(65) Prior Publication Data

US 2025/0068289 A1 Feb. 27, 2025

Related U.S. Application Data

(63) Continuation of application No. 17/826,630, filed on May 27, 2022, now Pat. No. 12,164,738, which is a (Continued)

(30) Foreign Application Priority Data

Jun. 17, 2021 (KR) ........................ 10-2021-0078535

(51) Int. Cl.

*G06F 3/046* (2006.01)
*G06F 1/16* (2006.01)

(Continued)

(52) U.S. Cl.

CPC ............ *G06F 3/046* (2013.01); *G06F 1/1643* (2013.01); *G06F 1/1656* (2013.01); *G06F 3/0416* (2013.01); *G06F 3/03545* (2013.01)

(58) Field of Classification Search

CPC ...... G06F 3/046; G06F 1/1643; G06F 1/1656; G06F 3/0416; G06F 3/03545; G06F 1/1632; G06F 1/1626

See application file for complete search history.

(56) References Cited

U.S. PATENT DOCUMENTS 324,175 A 8/1885 Shaw
9,426,567 B2 8/2016 Lee (Continued)

FOREIGN PATENT DOCUMENTS

KR 1020160038655 4/2016
KR 1020160100674 8/2016
KR 1020200122688 10/2020

OTHER PUBLICATIONS

International Search Report dated Aug. 19, 2022 issued in counterpart application No. PCT/KR2022/007223, 10 pages.
Korean Office Action dated Sep. 10, 2025 issued in counterpart application No. 10-2021-0078535, 13 pages.

*Primary Examiner* — David D Davis
(74) *Attorney, Agent, or Firm* — The Farrell Law Firm, P.C.

(57) ABSTRACT

An electronic device is provided and includes a housing, and a display module disposed on a front surface of the housing and including a display panel, a conductive pattern, and a digitizer panel disposed under the display panel; a digitizer circuit connected to the digitizer panel; and a processor electrically connected to the display module and the digitizer circuit. The digitizer circuit may be configured to recognize a first signal generated as the first cover of a cover device including a cover coil approaches the digitizer panel; and recognize a second signal generated as a pen input device (Continued)

approaches the digitizer panel. The processor may be configured to control the display module in response to recognition of the first signal and the second signal.

19 Claims, 14 Drawing Sheets

Related U.S. Application Data continuation of application No. PCT/KR2022/007223, filed on May 20, 2022.

(51) Int. Cl.

*G06F 3/041* (2006.01)
*G06F 3/0354* (2013.01)

(56) References Cited

U.S. PATENT DOCUMENTS

| | | | | |
|---|---|---|---|---|
| 9,594,398 | B2 | 3/2017 | Liang | |
| 9,715,254 | B2 | 7/2017 | Mori et al. | |
| 10,594,350 | B2 | 3/2020 | Son | |
| 11,132,020 | B2 | 9/2021 | Kim et al. | |
| 2013/0271373 | A1 | 10/2013 | Milhe et al. | |
| 2015/0298859 | A1 | 10/2015 | Amano | |
| 2016/0241687 | A1 | 8/2016 | Son | |
| 2017/0034337 | A1 | 2/2017 | Alameh et al. | |
| 2019/0310737 | A1* | 10/2019 | Jeong | G06F 3/0418 |
| 2019/0346881 | A1 | 11/2019 | Chai | |
| 2020/0174529 | A1 | 6/2020 | Goh | |
| 2020/0333836 | A1 | 10/2020 | Kim et al. | |

* cited by examiner

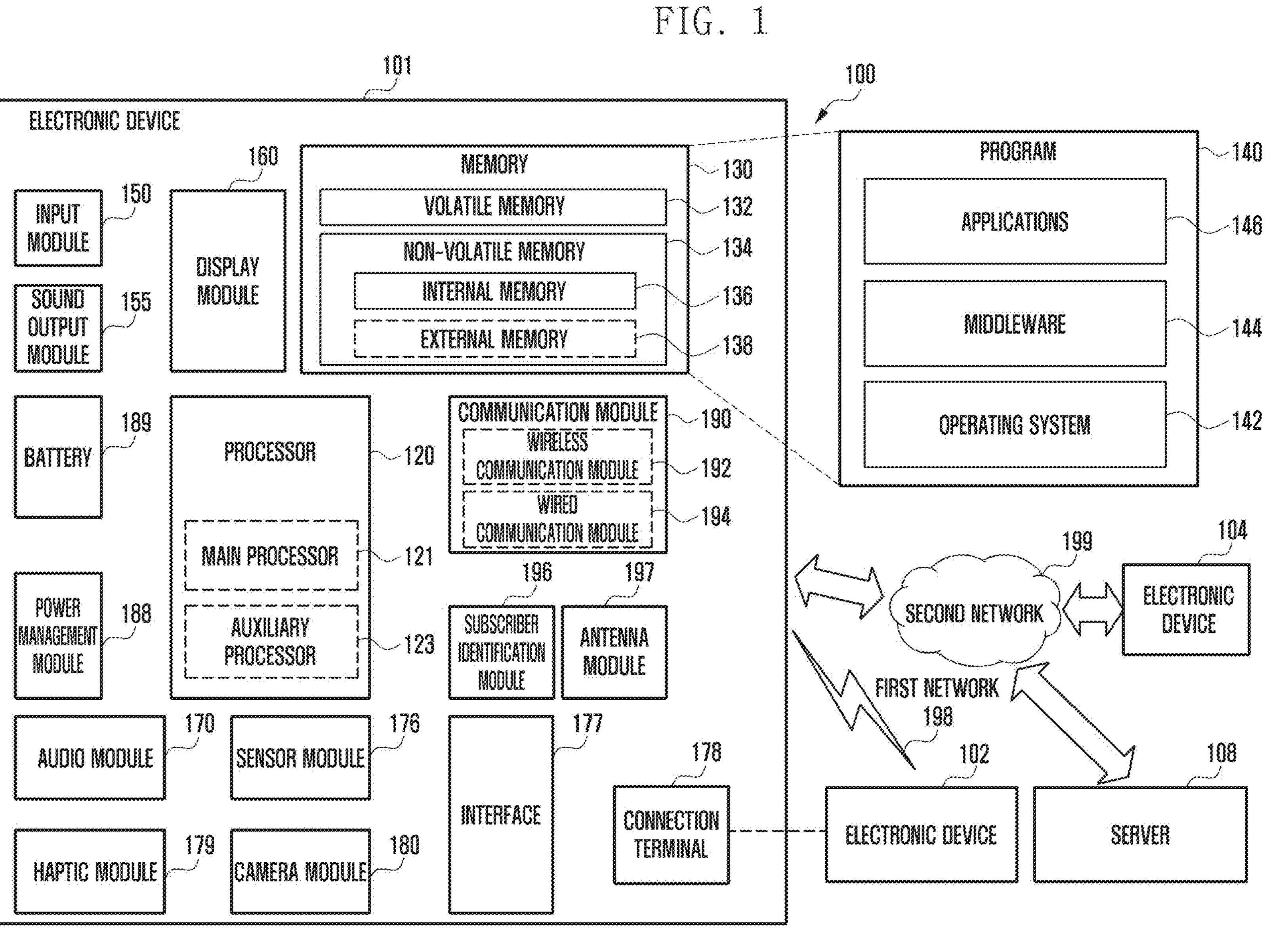
FIG. 1
100
101
ELECTRONIC DEVICE
150
INPUT MODULE
155
SOUND OUTPUT MODULE
160
DISPLAY MODULE
130
MEMORY
132
VOLATILE MEMORY
134
NON-VOLATILE MEMORY
136
INTERNAL MEMORY
138
EXTERNAL MEMORY
189
BATTERY
120
PROCESSOR
121
MAIN PROCESSOR
123
AUXILIARY PROCESSOR
190
COMMUNICATION MODULE
192
WIRELESS COMMUNICATION MODULE
194
WIRED COMMUNICATION MODULE
188
POWER MANAGEMENT MODULE
196
SUBSCRIBER IDENTIFICATION MODULE
197
ANTENNA MODULE
170
AUDIO MODULE
176
SENSOR MODULE
177
INTERFACE
178
CONNECTION TERMINAL
179
HAPTIC MODULE
180
CAMERA MODULE
140
PROGRAM
146
APPLICATIONS
144
MIDDLEWARE
142
OPERATING SYSTEM
199
SECOND NETWORK
104
ELECTRONIC DEVICE
FIRST NETWORK
198
102
ELECTRONIC DEVICE
108
SERVER

ELECTRONIC DEVICE, COVER DEVICE, AND CONTROL METHOD FOR RECOGNIZING SIGNALS AND CONTROLLING A DISPLAY MODULE OF ELECTRONIC DEVICE

CROSS-REFERENCE TO RELATED APPLICATION(S)

This application is a Continuation of U.S. Ser. No. 17/826,630, which was filed at the United States Patent Office on May 27, 2022, which is a Bypass Continuation Application of PCT International Application No. PCT/KR2022/007223, which was filed on May 20, 2022, and claims priority to Korean Patent Application No. 10-2021-0078535, which was filed in the Korean Intellectual Property Office on Jun. 17, 2021, the entire content of each of which is incorporated herein by reference.

BACKGROUND

1. Field

The present disclosure relates generally to an electronic device, a cover device detachably coupled to the electronic device and formed to be foldable, and a method for controlling a display module of the electronic device.

2. Description of Related Art

To protect an electronic device from external impact and prevent foreign substances from entering the electronic device, a cover device coupled to the electronic device may be utilized. This cover device may be fabricated to cover the display module to protect the display module from external impact.

By covering the display module with the cover device, opening and closing the cover device is convenient and it protects the display module. For example, when the cover device covers the display module, the display module may be switched to an off state; when the cover device does not cover the display module, the display module may be switched to an on state.

Meanwhile, the cover device coupled to the electronic device may include various input devices such as a physical keyboard.

To control the display module according to the opening and closing of the cover device, a sensor capable of detecting the opening and closing of the cover device may be required. For example, the opening and closing of the cover device may be sensed using a Hall sensor that detects a change in the magnetic field. However, when the Hall sensor is included in the cover device, there may be a problem that power must be continuously supplied for the operation of the Hall sensor.

SUMMARY

The present disclosure has been made to address the above-mentioned problems and disadvantages, and to provide at least the advantages described below.

According to an aspect of the disclosure, an electronic device includes a housing; and a display module disposed on a front surface of the housing and including a display panel, a conductive pattern, and a digitizer panel disposed under the display panel. The electronic device further includes a digitizer circuit connected to the digitizer panel; and a processor electrically connected to the display module and the digitizer circuit. The digitizer circuit is configured to recognize a first signal generated as a first cover of a cover device including a cover coil approaches the digitizer panel; and recognize a second signal generated as a pen input device approaches the digitizer panel. The processor is configured to control the display module in response to recognition of the first signal and the second signal.

According to another aspect of the disclosure, a cover device includes a first cover formed to cover the front surface of an electronic device; a second cover formed to cover the rear surface of the electronic device; a first folding part that foldably connects the first cover and the second cover; an input device disposed on the first cover; and a cover coil disposed on the first cover to generate a first signal when approaching the digitizer panel of the electronic device.

According to another aspect of the disclosure, a control method of a display module including a digitizer panel includes recognizing, by a digitizer circuit, a first signal generated as a first cover of a cover device including a cover coil approaches the digitizer panel; recognizing, by the digitizer circuit, a second signal generated as a pen input device approaches the digitizer panel; and controlling, by a processor, the display module in response to recognition of the first signal and the second signal.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram of an electronic device in a network environment, according to an embodiment;

DETAILED DESCRIPTION

Figure 2:
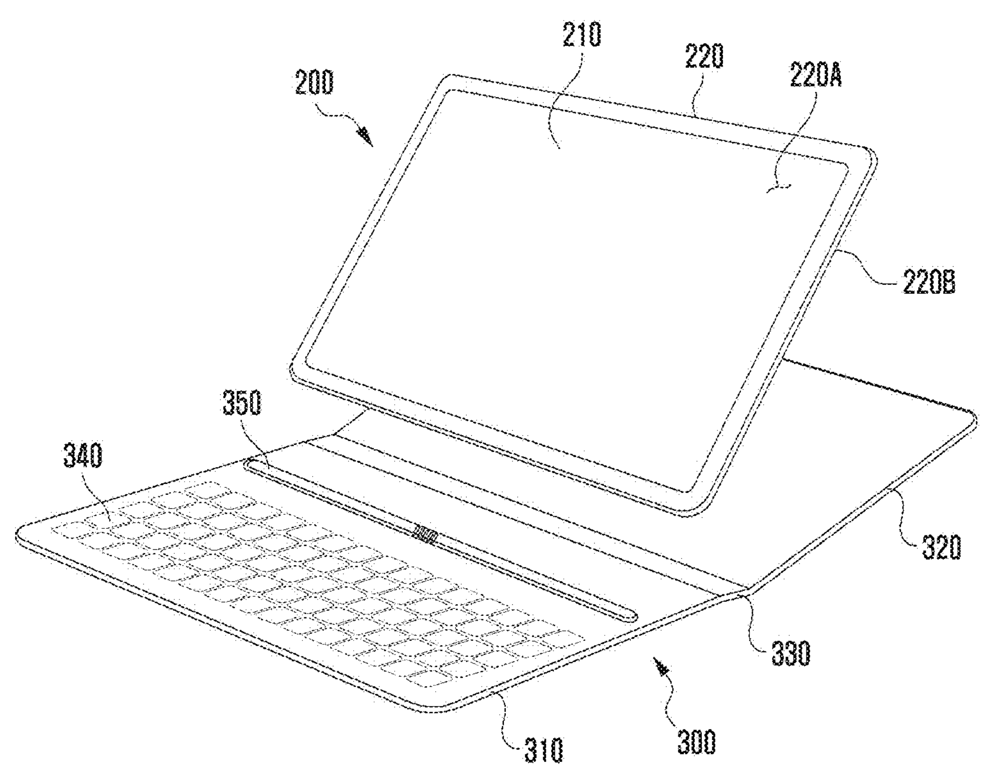
FIG. 2 is a perspective view of an electronic device and a cover device, according to an embodiment.

Through various embodiments disclosed in this document, it is possible to provide an electronic device, a cover device, and a method of controlling a display module wherein the display module can be controlled by checking whether the cover device is opened or closed without continuously supplying power to the cover device.

According to various embodiments, it is possible to control the display module by detecting whether the cover device is opened or closed without supplying power to the cover device. As a result, standby power consumption may be reduced, and thus the usage time of the electronic device may be improved.

In addition, as a new component is not added to the electronic device for opening and closing the cover device, there is an effect of lowering the manufacturing cost of the electronic device.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a perspective view of an electronic device and a cover device, according to an embodiment.

Referring to FIG. 2, the cover device 300 is detachably coupled to the electronic device 200. The cover device 300 coupled to the electronic device 200 may protect the electronic device 200 from external impact. The cover device 300 may be electrically connected to the electronic device 200. Various input devices 340 (e.g., a physical keyboard or touch pad) included in the cover device 300 may be used to deliver an input signal to the electronic device 200.

Figure 3:
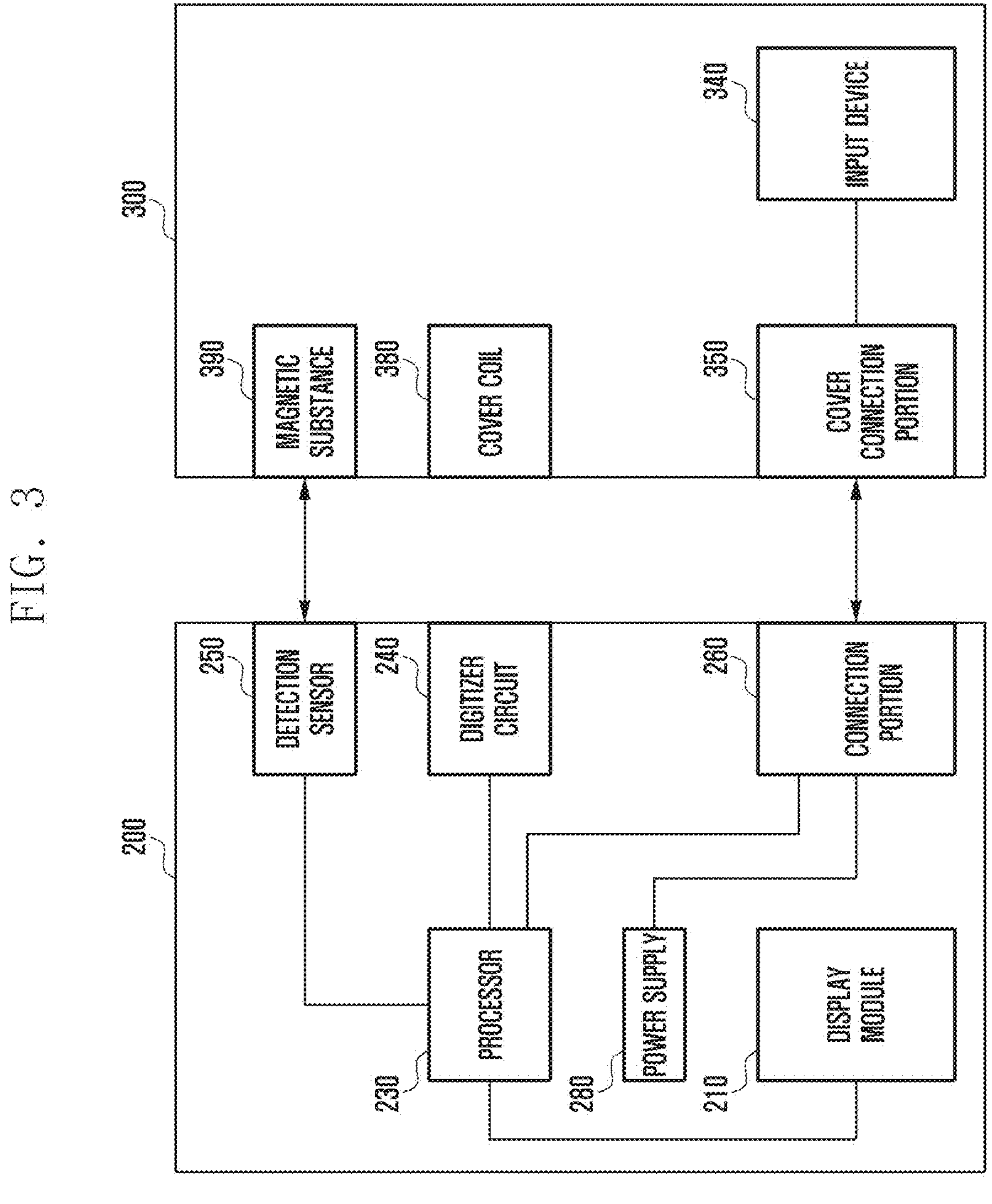
FIG. 3 is a block diagram of the electronic device and the cover device, according to an embodiment.
Figure 4:
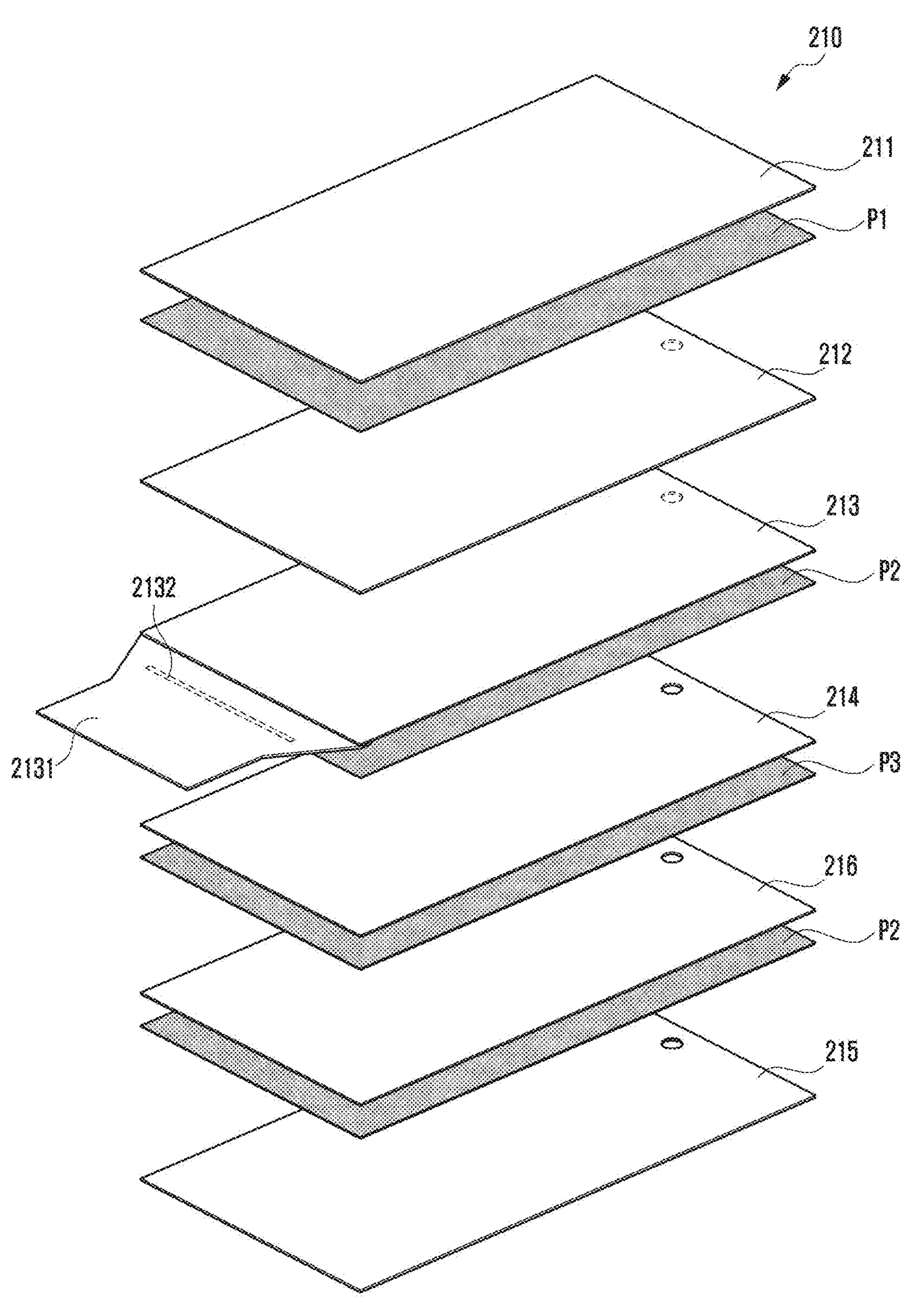
FIG. 4 is an exploded perspective view of a display module, according to an embodiment.

First, a description will be given of the electronic device 200 with reference to FIGS. 2-4. FIG. 3 is a block diagram of the electronic device and the cover device, according to an embodiment. FIG. 4 is an exploded perspective view of a display module, according to an embodiment.

The electronic device 200 described below may include the electronic device 101 described with reference to FIG. 1. Hence, the electronic device 200 may include at least one of the components described with reference to FIG. 1.

Referring to FIGS. 2-4, the electronic device 200 includes a housing 220, a display module 210, a digitizer circuit 240, a detection sensor 250, and a processor 230. The components of the electronic device 200 described above are merely components listed for the purpose of describing the disclosure, and the electronic device 200 may further include other components (e.g., components shown in FIG. 1). In some cases, some of the components listed above may be omitted.

The processor 230 may be electrically connected to electrical objects included in the electronic device 200 to perform various functions. With reference to FIG. 3, the processor 230 may be electrically connected to the display module 210, the digitizer circuit 240, the detection sensor 250, the connection portion 260, and the power supply 280.

The housing 220 may support various components included in the electronic device 200. The housing 220 may be composed of plural parts. The housing 220 may be made of various materials (e.g., a synthetic resin material, a metal material, and/or a composite material). The housing 220 may include both a portion constituting the external appearance of the electronic device 200 and a portion forming an internal structure of the electronic device 200.

The display module 210 may include an on cell touch active (OCTA) matrix organic light-emitting diode (AMOLED) flat type display panel 213. Besides, the display module 210 may include an unbreakable (UB) type organic light emitting diode (OLED) display (e.g., a curved display) panel 230.

With reference to FIG. 4, the display module 210 includes, in addition to a window layer 211, a polarization layer 212 (e.g., a polarizer or polarization film) (POL), a display panel 213, a polymer layer 214, and a metal sheet layer 215, which are disposed in sequence on the rear surface of the window layer 211. The display panel 213 includes a digitizer panel 216 disposed between the polymer layer 214 and the metal sheet layer 215 or on the rear surface of the metal sheet layer 215.

The window layer 211 may include a glass layer. The window layer 211 may include ultra-thin glass (UTG). The window layer 211 may include a polymer, e.g., a polyethylene terephthalate (PET) or polyimide (PI). The window layer 211 may be disposed in a plurality of layers including a glass layer and a polymer.

The window layer 211, the polarization layer 212, the display panel 213, the polymer layer 214, and the metal sheet layer 215 may be attached to each other through an adhesive P1, P2, P3, and P4. The adhesives P1, P2, P3 and P4 may include at least one of an optical clear adhesive (OCA), a pressure sensitive adhesive (PSA), a heat-responsive adhesive, a general adhesive, or a double-sided tape.

The display panel 213 may include a plurality of pixels and wiring structures (e.g., an electrode pattern). The polarization layer 212 may selectively pass light that is generated from a light source of the display panel 213 and cause a vibration in a preset direction. The display panel 213 and the polarization layer 212 may be integrally formed. The display panel 213 may include a touch panel.

The polymer layer 214 may be disposed under the display panel 213 to thereby provide a dark background for ensuring visibility of the display panel 213, and may be made of a buffer material for a buffering action. For waterproofing the display module 210, the polymer layer 214 may be removed or may be disposed under the metal sheet layer 215.

The metal sheet layer 215 may include at least one of steel use stainless (SUS) (e.g., stainless steel (STS)), copper (Cu), aluminum (Al), or a metal clad (e.g., a lamination member in which SUS and Al are alternately disposed). The metal sheet layer 215 may include other alloy materials. The metal sheet layer 215 may help to reinforce the rigidity of the electronic device 200, and may be used to shield ambient noise and dissipate heat radiated from surrounding heat dissipating components. In FIG. 4, the metal sheet layer 215 is shown as having the same area as the display panel 213, but the metal sheet layer 215 may be disposed on a portion of the display panel 213. In some cases, the metal sheet layer 215 may be omitted.

The digitizer panel 216 may be disposed between the metal sheet layer 215 and the polymer layer 214. In some cases, the digitizer panel 216 may be disposed under the metal sheet layer 215. The digitizer panel 216 may be a detection member that receives an input from a pen input device (e.g., a stylus). The digitizer panel 216 may include a plurality of conductive patterns. For example, the digitizer panel 216 may include a plurality of conductive loops. Currents flowing through the plural conductive loops may form a magnetic field. When an external electronic device (e.g., a stylus or cover device 300) including a coil comes close to the magnetic field formed by the digitizer panel 216, a resonant frequency may be generated. The resonant frequency may be determined according to inductance and capacitance of the external electronic device. The digitizer circuit 240 controlling the operation of the digitizer panel 216 may identify a specific frequency and a location at which the specific frequency is recognized by using the plural conductive loops included in the digitizer panel 216. For example, when a pen input device comes close to the digitizer panel 216, the digitizer circuit 240 may identify the generation and location of the resonance frequency of the pen input device. Through this, a pen input from the pen input device may be recognized.

The display module 210 may include at least one functional member disposed between the polymer layer 214 and the metal sheet layer 215 or under the metal sheet layer 215. The functional member may include a graphite sheet for heat dissipation, a touch sensor supporting the touch function of the display module 210, a force touch flexible PCB (FPCB), a fingerprint sensor FPCB, an antenna radiator for communication, or a conductive/non-conductive tape.

The display module 210 may include an FPCB 2131 disposed in a manner of folding from the display panel 213 to at least some of the rear surface of the display module 210. The FPCB 2131 may be electrically connected to the display panel 213. The FPCB 2131 may include a display driver IC (DDI). A PCB connected to the FPCB 2131 may include a touch display driver IC (TDDI). The FPCB connected to the display panel 213 may include both the DDI and the TDDI. The display module 210 may include a chip-on-film (COF) structure in which the DDI 2132 is disposed on the FPCB 2131 electrically connected to the display panel 213. The display module 210 may include a chip-on-panel or chip-on-plastic (COP) structure in which the DDI 2132 is disposed on a part of the display panel 213.

Various elements related to driving of the display module 210 may be disposed on the FPCB 2131. For example, a flash memory for the display, an electrostatic discharge (ESD) protection diode, a pressure sensor, and/or a passive element such as a decapping device may be disposed on the FPCB 2131.

The display module 210 may be disposed in the housing 220 so that the display panel 213 is viewed as the front surface 220A of the housing 220.

The detection sensor 250 may be a sensor that detects whether an object is in proximity. For example, the detection sensor 250 may be a Hall sensor capable of detecting a change in a magnetic field. The detection sensor 250 may determine whether the magnetic substance 390 is in proximity by detecting a magnetic field change caused by the proximity of the magnetic substance 390. When the magnetic substance 390 is disposed in the cover device 300, the detection sensor 250 may detect a magnetic field change caused by the proximity of the magnetic substance 390 included in the cover device 300. Accordingly, it is possible to identify whether the cover device 300 is attached to the electronic device 200 by using the detection sensor 250.

The digitizer circuit 240 may be a circuit that controls the digitizer panel 216. For example, the digitizer circuit 240 may detect and recognize a signal of a specific frequency through the digitizer panel 216.

The electronic device 200 may be electrically connected to an external electronic device (e.g., the cover device 300) through the connection portion 260. The connection portion 260 may include, for example, a pogo-pin.

The power supply 280 may supply power for the operation of the electronic device 200. The power supply 280 may be a rechargeable battery. The power supply 280 may supply power to an external electronic device connected through the connection portion 260.

Next, a description will be given of the cover device 300 with reference to FIGS. 2-3 and 5A-5D.

Figure 5A:
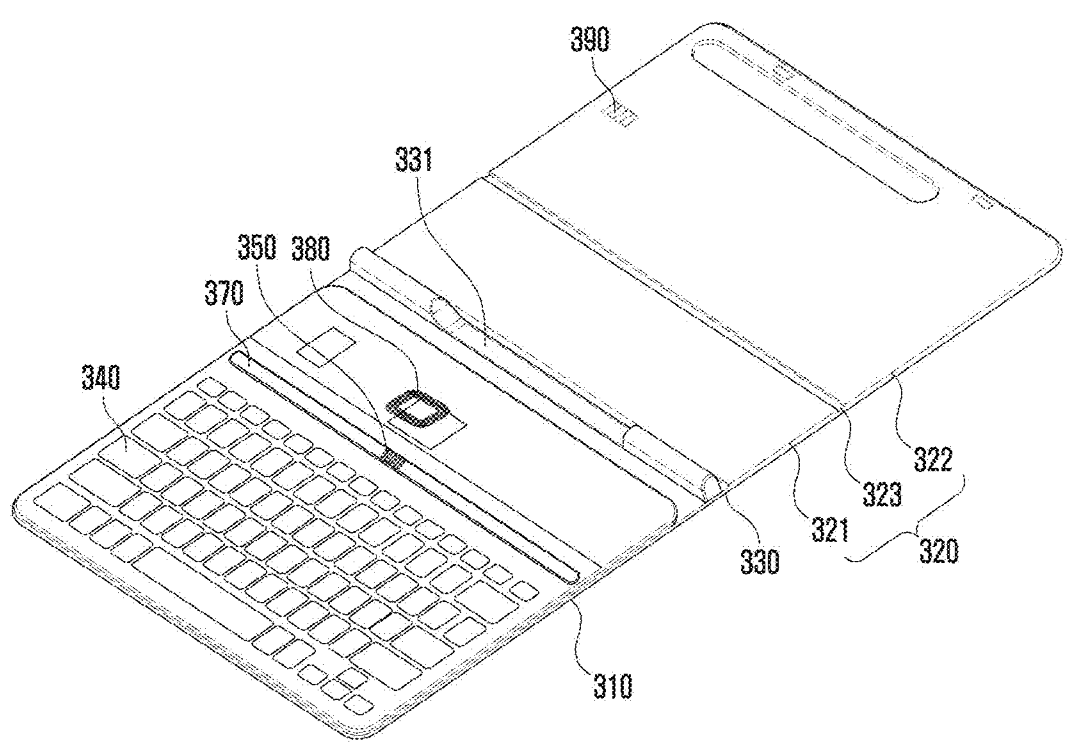
FIG. 5A is a perspective view of the cover device, according to an embodiment.
Figure 5B:
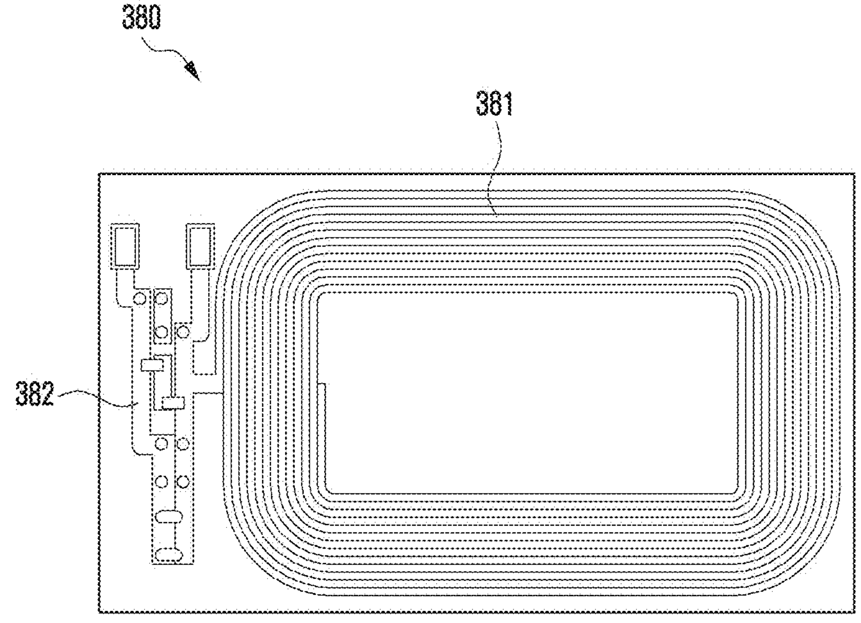
FIG. 5B is a view of a cover coil of the cover device, according to an embodiment.
Figure 5C:
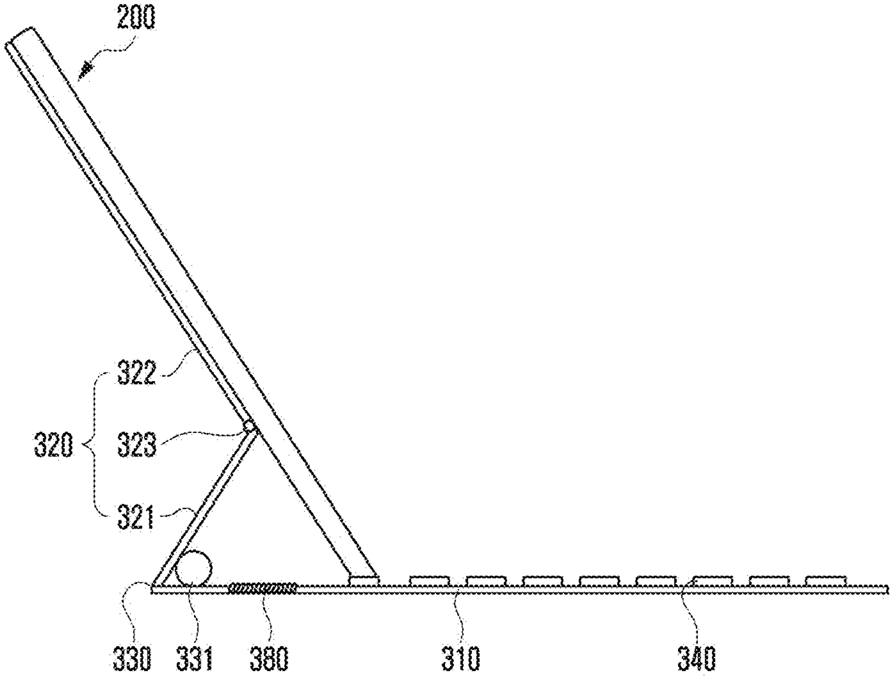
FIG. 5C is a view showing a state in which the cover device supports the electronic device at a specific angle, according to an embodiment.
Figure 5D:
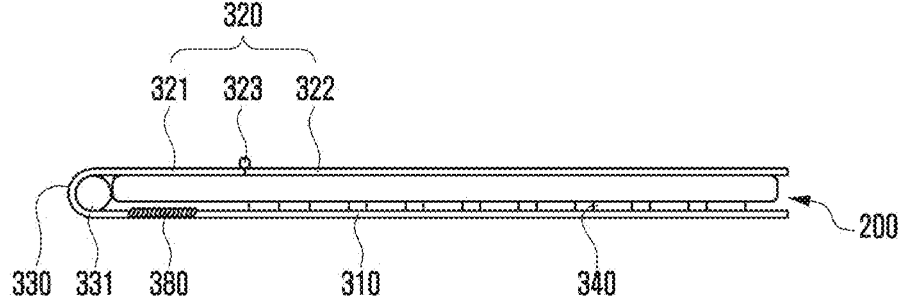
FIG. 5D is a view showing a state in which the cover device covers the electronic device, according to an embodiment.

FIG. 5A is a perspective view of the cover device, according to an embodiment. FIG. 5B is a view of a cover coil of the cover device, according to an embodiment. FIG. 5C is a view showing a state in which the cover device supports the electronic device at a specific angle, according to an embodiment. FIG. 5D is a view showing a state in which the cover device covers the electronic device, according to an embodiment.

The cover device 300 may be detachably coupled to the electronic device 200. The cover device 300 may include a structure in which a plurality of parts are foldably connected. The cover device 300 may include a folding structure of a first cover 310 and a second cover 320.

According to the folding state of the cover device 300, the cover device 300 may cover the electronic device 200 or may support the electronic device 200 at a specific angle. In the following description, a state in which the cover device 300 covers the electronic device 200 as shown in FIG. 5D will be referred to as a "cover state", and a state in which the cover device 300 supports the electronic device 200 at a specific angle as shown in FIG. 5C will be referred to as a "standing state".

Referring to FIGS. 2-3 and 5A-5D, the cover device 300 includes a first cover 310, a second cover 320, an input device 340, a cover coil 380, and a receiving portion 331. The above-mentioned components of the cover device 300 are illustrative only, and the cover device 300 may further include various other components, and some of the above-mentioned components may be omitted.

The first cover 310 and the second cover 320 may be foldably connected to each other through a first folding part 330. The first cover 310 may be formed to cover the front surface 220A of the electronic device 200, and the second cover 320 may be formed to cover the rear surface 220B of the electronic device 200. In a state in which the first cover 310 and the second cover 320 are folded, the first cover 310 may cover the display panel 213 disposed on the front surface 220A of the electronic device 200. The second cover 320 may cover the rear surface 220B of the electronic device 200. The first cover 310 and the second cover 320 may be detachably coupled to the electronic device 200 through magnetic coupling. Also, the first cover 310 and the second cover 320 may be detachably coupled to the electronic device 200 through various methods other than magnetic coupling (e.g., via a non-slip pad).

With reference to FIG. 5A, a receiving portion 331 capable of accommodating a pen input device is disposed in the first folding part 330 that foldably connects the first cover 310 and the second cover 320. The receiving portion 331 may be formed to correspond to the shape of the pen input device.

The input device 340 may be disposed on the first cover 310. The input device 340 may include a physical keyboard, a touch pad, and a biometric information input device (e.g., a fingerprint recognition device). When the electronic device 200 and the cover device 300 are electrically connected, an input signal generated by the input device 340 may be transmitted to the electronic device 200. The electronic device 200 may receive an input signal generated by the input device 340 and perform various functions.

The cover coil 380 may be disposed on the first cover 310. With reference to FIG. 5B, the cover coil 380 includes a coil 381 and a capacitor 382. The resonant frequency of the cover coil 380 may be determined according to the inductance of the coil 381 and the capacitance of the capacitor 382. When the first cover 310 comes close to the display module 210 of the electronic device 200, a resonant frequency may be generated by a magnetic field generated by the digitizer panel 216 included in the display module 210. The resonant frequency of the cover coil 380 may be changed by replacing the capacitor 381 of the cover coil 380. The cover coil 380 may be disposed between the input device 340 and the first folding part 330. With reference to FIG. 5A, the cover coil 380 may be disposed between the cover connection portion 350 and the first folding part 330. The arrangement position of the cover coil 380 is illustrative only, and the cover coil 380 may be arranged at any position on the first cover 310 covering the display panel 213 of the electronic device 200.

The cover connection portion 350 may be disposed on the first cover 310. The cover connection portion 350 may be electrically connected to the connection portion 260 of the electronic device 200. For example, in a standing state, the connection portion 260 of the electronic device and the cover connection portion 350 of the cover device 300 may be in contact and may be electrically connected. The cover connection portion 350 and the connection portion 260 of the electronic device 200 may include a pogo-pin. When the cover connection portion 350 and the connection portion 260 are electrically connected, the cover device 300 and the electronic device 200 may be electrically connected. Through the connection between the electronic device 200 and the cover device 300, the electronic device 200 may supply power to the cover device 300, and the cover device 300 may transmit an input signal generated by the input device 340 to the electronic device 200. The cover connection portion 350 may include a recess 370. The recess 370 may be a portion that partially accommodates the housing 220 of the electronic device 200 so that the electronic device 200 can be maintained in a state inclined at a specific inclination with the first cover 310 while the connection portion 260 of the electronic device 200 is in contact with the cover connection portion 350.

The second cover 320 may be formed to cover the rear surface 220B of the electronic device 200. The second cover 320 may include a first sub-cover 321 and a second sub-cover 322. The first sub-cover 321 and the second sub-cover 322 may be foldably connected through a second folding part 323. The first sub cover 321 may be foldably connected to the first cover 310 through the first folding part 330. As shown in FIG. 5D, in the cover state, the first sub-cover 321 and the second sub-cover 322 are coupled to the rear surface 220B of the electronic device 200. The first sub-cover 321 and the second sub-cover 322 may be coupled to the rear surface 220B of the electronic device 200 through magnetic coupling. The first sub-cover 321 and the second sub-cover 322 may include a plurality of magnets to be magnetically coupled to the rear surface 220B of the electronic device 200. With reference to FIG. 5C, in the standing state, the first sub-cover 321 is detached from the rear surface 220B of the electronic device 200. The second sub-cover 322 may be more strongly coupled to the rear surface 220B of the electronic device 200 compared with the first sub-cover 321. During a transition from the cover state to the standing state, the first sub-cover 321 may be detached from the rear surface 220B of the electronic device 200, but the second sub-cover 322 may be maintained to be coupled to the rear surface 220B of the electronic device 200.

The second cover 320 may include a magnetic substance 390. The magnetic material 390 may be disposed at a position corresponding to the position at which the detection sensor 250 of the electronic device 200 is disposed, in the cover state (refer to FIG. 8A). The detection sensor 250 of the electronic device 200 may identify whether the magnetic substance 390 is in proximity. The detection sensor 250 may determine whether the second cover 320 is coupled to the rear surface 220B of the electronic device 200 by checking whether the magnetic body 390 is in proximity. With reference to FIG. 5A, the magnetic substance 390 is disposed on the second sub-cover 322.

With reference to FIG. 5D, in the cover state, the first cover 310 covers the front surface 220A of the electronic device 200, and the second cover 320 covers the rear surface 220B of the electronic device 200. With reference to FIG. 5C, in the standing state, the first sub-cover 321 of the second cover 320 is detached from the rear surface 220B of the electronic device 200, and the second sub-cover 322 is coupled to the rear surface 220B of the electronic device 200. The first sub-cover 321 and the second sub-cover 322 may make a specific angle. Also, the first sub-cover 321 and the first cover 310 may make a specific angle. When the first sub-cover 321 and the second sub-cover 322 make a specific angle and the first sub-cover 321 and the first cover 310 make a specific angle, as shown in FIG. 5C, the cover device 300 supports the electronic device 200 at a specific angle. In this state, the connection portion 260 of the electronic device 200 may be in contact with the cover connection portion 350 of the cover device 300 to thereby make an electrical connection. In the standing state, the input device 340 disposed on the first cover 310 may make a specific angle with the display panel 213 of the electronic device 200.

Figure 6:
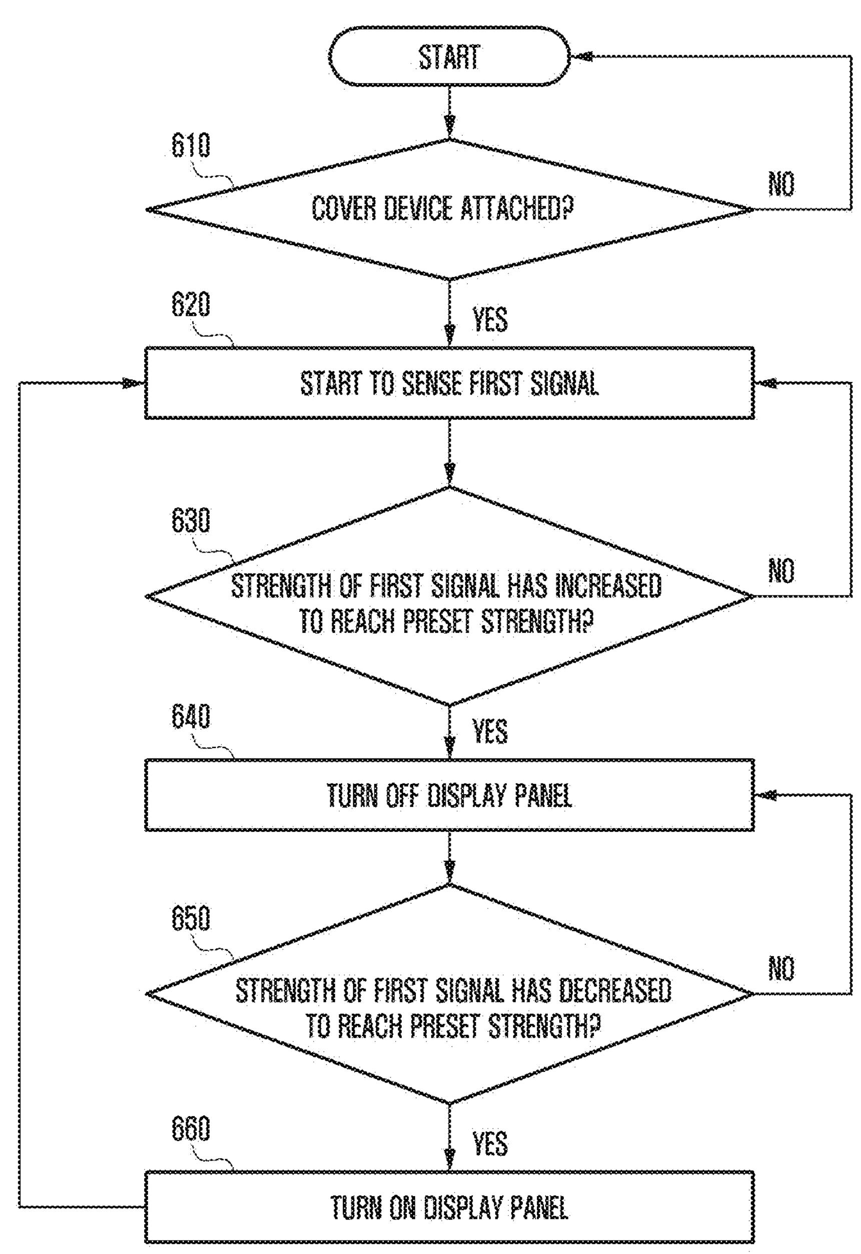
FIG. 6 is a flowchart illustrating an operation for controlling the display module, according to an embodiment.
Figure 7:
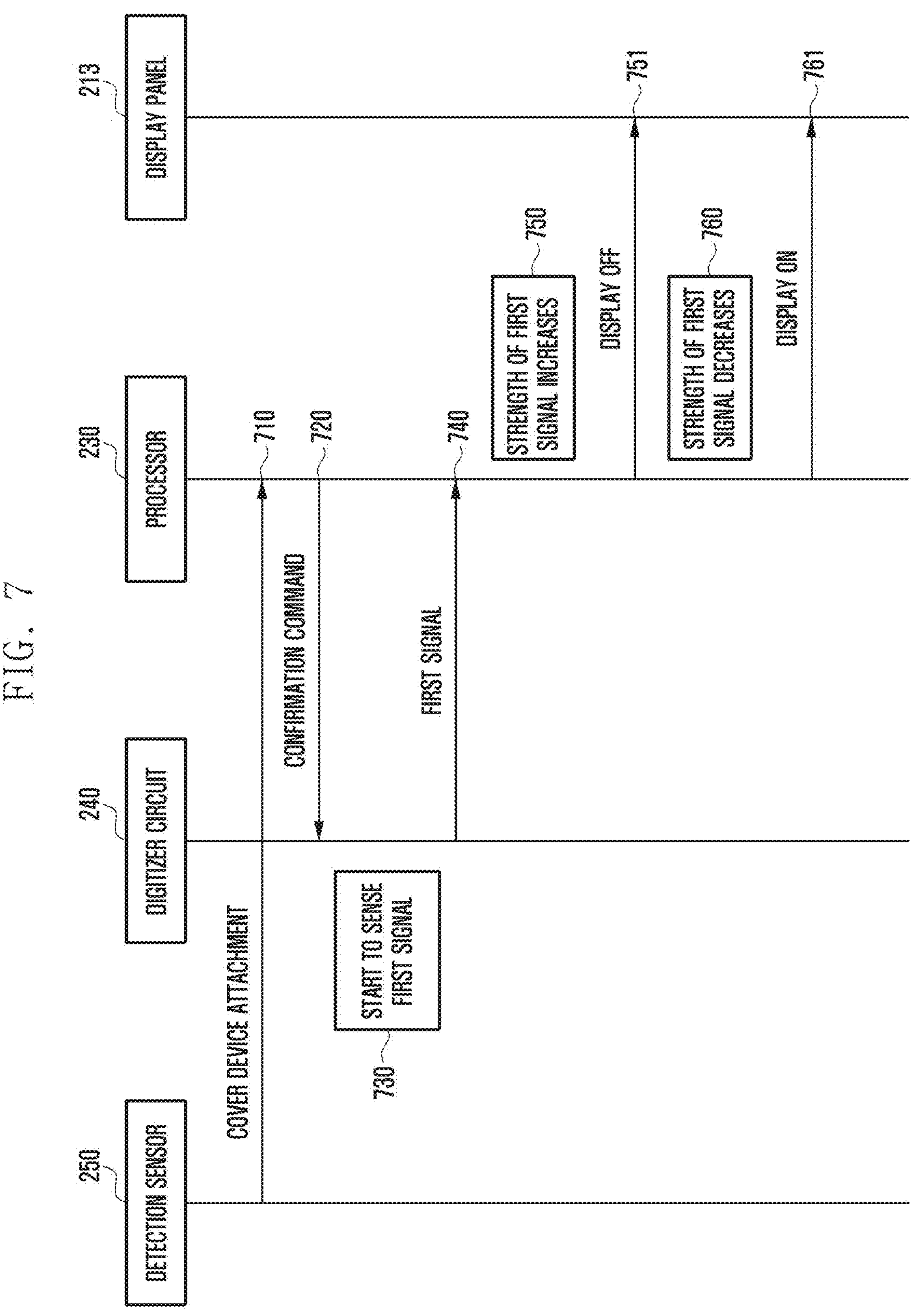
FIG. 7 is a signal flow diagram illustrating an operation for controlling the display module, according to an embodiment.
Figure 8A:
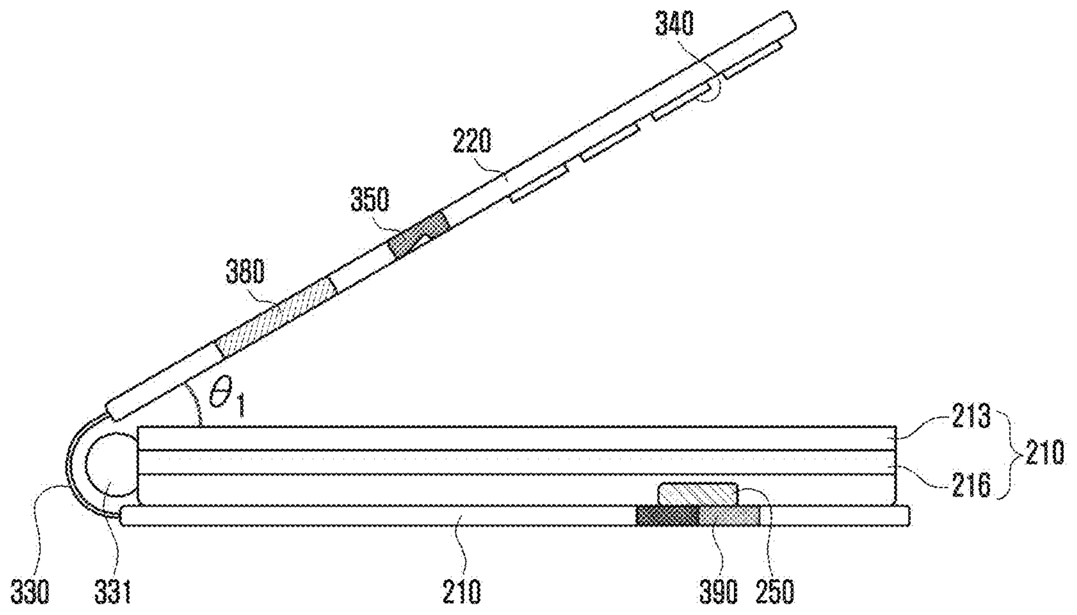
FIGS. 8A and 8B are views of the electronic device and the cover device, according to various embodiments.
Figure 8B:
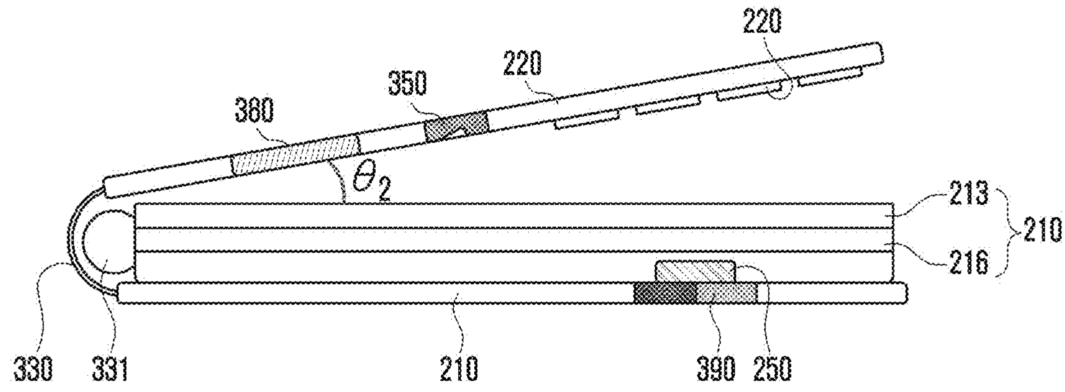

FIG. 6 is a flowchart illustrating an operation for controlling the display module, according to an embodiment. FIG. 7 is a signal flow diagram illustrating an operation for controlling the display module, according to an embodiment. That is, FIG. 6 is a traditional flowchart showing steps for controlling the display module, and FIG. 7 is signal flow diagram showing communication steps among device elements (e.g., digitizer circuit 240, processor 230, and display panel 213) for controlling the display module. Therefore, as explained below, operations included in some of the steps of FIG. 6 overlap with some of the steps of FIG. 7. FIGS. 8A and 8B are views of the electronic device and the cover device, according to various embodiments.

The electronic device 200 may recognize a first signal generated by the digitizer circuit 240 according to the proximity of the cover coil 380 included in the cover device 300. The processor 230 may control the display module 210 based on recognition of the first signal.

When an external electronic device including a coil comes close to a magnetic field formed by plurality of conductive patterns included in the digitizer panel 216, a resonant frequency may be generated. In the following description, a signal including a resonant frequency generated according to an approach of the cover device 300 including the cover coil 380 is referred to as a “first signal”, and a signal including a resonant frequency generated according to an approach of a pen input device including a coil is referred to as a “second signal”. The first signal and the second signal may be signals having different frequencies.

Referring to FIGS. 6-7 and 8A-8B, in step 610, the processor 230 checks whether the second cover 320 of the cover device 300 is attached to the electronic device 200 by using the detection sensor 250. For example, the detection sensor 250 transmits a signal generated according to the attachment of the cover device 300 to the processor 230, as shown in step 710. As shown in FIGS. 8A and 8B, the position of the magnetic substance 390 of the cover device 300 corresponds to the position of the detection sensor 250 of the electronic device 200.

When the attachment of the cover device 300 is confirmed, the processor 230 transmits a confirmation command to the digitizer circuit 240 in step 720. Upon receiving the confirmation command transmitted in step 720, the digitizer circuit 240 starts to sense a first signal by using the digitizer panel 216, as shown in step 620 and step 730.

When the first cover 310 approaches the display module 210, a first signal may be recognized by the digitizer panel 216 included in the display module 210. In step 740, the digitizer circuit 240 transmits the recognized first signal to the processor 230. The processor 230 determines the degree of proximity of the first cover 310 to the digitizer panel 216 by checking the strength of the first signal in step 630. When the strength of the first signal increases in step 750, the processor 230 control the display panel 213 to be in an off state in step 751. For example, when the first signal increases to reach a preset strength in step 630, the processor 230 may control the display panel 213 to display another screen (e.g., display an always on display (AOD) or a lock screen) or other information, adjust the brightness thereof, or control the display panel 213 to be in an off state. The off state of the display panel 213 may mean a state in which visual information is not displayed on the display panel 213. An increase in the strength of the first signal may be recognized by the digitizer circuit 240. When the strength of the first signal increases to reach a preset strength, the digitizer circuit 240 may transmit a signal for notifying that the strength has reached the preset strength to the processor 230.

When the first cover 310 is moved away from the display module 210, the strength of the first signal recognized by the digitizer circuit 240 may decrease. When the strength of the first signal decreases in step 760, the display panel 213 may display another screen or other information, adjust the brightness thereof, or be in an on state in step 761. In step 650, the processor 630 determines whether the strength of the first signal has decreased to reach the preset strength. When the first signal decreases to reach a preset strength (Yes in step 650), the processor 230 controls the display panel 213 to be in an on state in step 660. The on state of the display panel 213 may mean a state in which visual information can be displayed on the display panel 213. A decrease in the strength of the first signal may be recognized by the digitizer circuit 240. When the strength of the first signal decreases to reach a preset strength, the digitizer circuit 240 may transmit a signal for notifying that the first signal has decreased to reach the preset strength to the processor 230. When the display panel 213 is controlled to be in an on state, an increase or decrease of the first signal may be sensed again.

As the arrangement position of the cover coil 380 is fixed on the first cover 310, the proximity of the first cover 310 may be represented by an angle between the first cover 310 and the display module 210. When the strength of the first signal increases, the angle between the first cover 310 and the display module 210 may decrease. When the strength of the first signal decreases, the angle between the first cover 310 and the display module 210 may increase. In some cases, the strength of the first signal and the angle between the first cover 310 and the display module 210 may be mapped and stored. In this case, changes in a strength of the first signal may correspond to changes in an angle. The display module 210 may be controlled by using the angle between the first cover 310 and the display module 210 being determined according to the strength of the first signal recognized by the digitizer circuit 240. For example, when the angle between the first cover 310 and the display module 210 becomes a first angle $\theta_1$ as shown in FIG. 8A, the display panel 213 may be controlled to be in an off state; when the angle between the first cover 310 and the display module 210 becomes a second angle $\theta_2$ in the cover state (a state in which the first cover 310 covers the display module 210) as shown in FIG. 8B, the display panel 213 may be controlled to be in an on state. The first angle $\theta_1$ and the second angle $\theta_2$ may be different from each other. For example, the first angle $\theta_1$ may be greater than the second angle $\theta_2$.

When the cover coil 380 is disposed farther from the first folding part 330, the change in the distance between the cover coil 380 and the digitizer panel 216 may appear larger in response to the change in the angle between the first cover 310 and the display module 210. The arrangement position of the cover coil 380 may be changed according to various design factors including the performance of the digitizer panel 216.

The digitizer circuit 240 may recognize a second signal generated as the pen input device is approached to the digitizer panel 216. A pen input operation by the pen input device may be performed based on recognition of the second signal. The pen input operation may include various actions such as executing a user interface related to the pen and performing pen input through recognition of the pen coordinates.

In the above description, although it has been described that the processor 230 transmits a confirmation command to the digitizer circuit 240 as the cover device 300 is attached by using the detection sensor 250 and the digitizer circuit 240 detects a first signal upon receiving the confirmation command, this is illustrative only. It is possible to determine whether a first signal is detected under various conditions. For example, the digitizer circuit 240 may continuously detect the first signal.

Figure 9A:
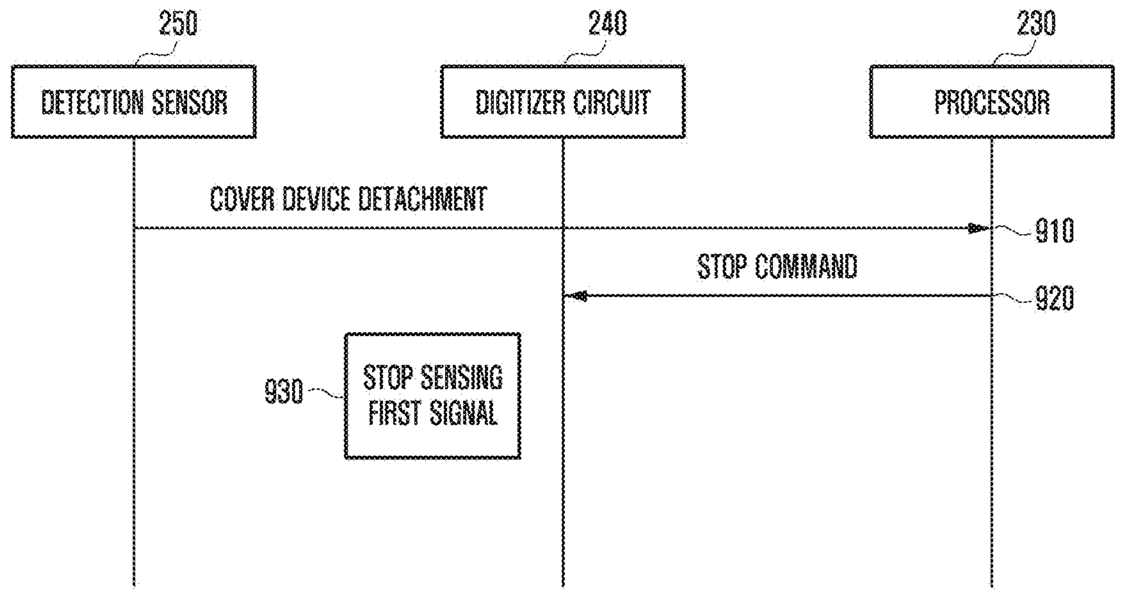
FIGS. 9A and 9B are signal flow diagrams of a method for controlling the display module, according to various embodiments.
Figure 9B:
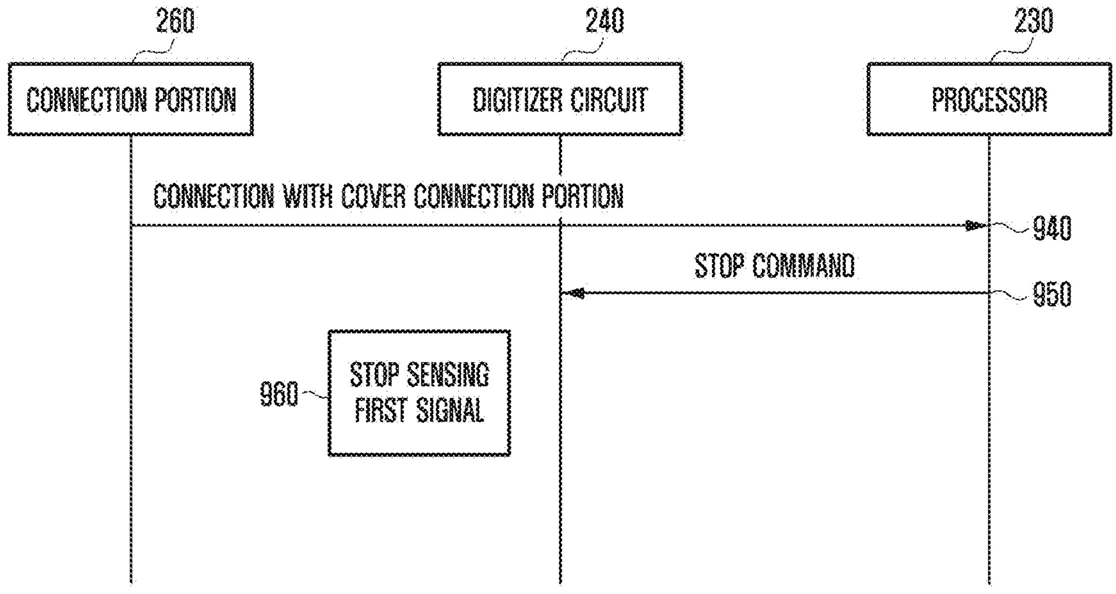

FIGS. 9A and 9B are signal flow diagrams of a method for controlling the display module, according to various embodiments.

The digitizer circuit 240 may not detect a first signal under certain circumstances. For example, when the cover device 300 is detached from the electronic device 200, as the cover device 300 does not cover the display module 210, it may not be necessary to detect the first signal. Also, as the cover device 300 does not cover the display module 210 in the standing state, it may not be necessary to detect the first signal.

Referring to FIGS. 9A-9B, the detection sensor 250 detects detachment of the cover device 300 and transmits a signal according to the detachment of the cover device 300 to the processor 230 in step 910. Upon confirming the detachment of the cover device 300, the processor 230 transmits a stop command to the digitizer circuit 240 in step 920. Upon receiving the stop command, the digitizer circuit 240 stops sensing the first signal in step 930.

When the connection portion 260 of the electronic device 200 is electrically connected to the cover connection portion 350 of the cover device 300, it transmits a signal according to the electrical connection to the processor 230 in step 940. The connection portion 260 and the cover connection portion 350 may be electrically connected in the standing state. Upon confirming the electrical connection between the connection portion 260 and the cover connection portion 350, the processor 230 transmits a stop command to the digitizer circuit 240 in step 950. Upon receiving the stop command, the digitizer circuit 240 stops sensing the first signal in step 960. When the electrical connection between the connection portion 260 and the cover connection portion 350 is released, the processor 230 may transmit a confirmation command to the digitizer circuit 240. Upon receiving the confirmation command, the digitizer circuit 240 may start sensing the first signal.

When a state in which the second cover 320 and the first cover 310 are folded to face each other (e.g., a back flip state) is detected while the second cover 320 does not cover the display module 210, the processor 230 may transmit a stop command to the digitizer circuit 240. The folding state of the second cover 320 and the first cover 310 may be identified through various methods (e.g., using a Hall sensor).

An electronic device according to an embodiment may include a housing, and a display module disposed on a front surface of the housing and including a display panel, a conductive pattern, and a digitizer panel disposed under the display panel. The electronic device further includes a digitizer circuit connected to the digitizer panel; and a processor electrically connected to the display module and the digitizer circuit. The digitizer circuit is configured to recognize a first signal generated as a first cover of a cover device including a cover coil approaches the digitizer panel; and recognize a second signal generated as a pen input device approaches the digitizer panel. The processor is configured to control the display module in response to recognition of the first signal and the second signal.

The processor may be configured to control the display module based on the strength of the first signal.

The processor may be configured to control the display module by checking the angle between the display module and the first cover of the cover device based on the strength of the first signal.

The electronic device may further include a detection sensor disposed in the housing, wherein the processor may be configured to check whether a second cover being foldably connected to the first cover of the cover device is attached to the rear surface of the housing by using the detection sensor, and transmit a confirmation command to the digitizer circuit, wherein the digitizer circuit may be configured to control the digitizer panel to recognize the first signal in response to the confirmation command.

The processor may be configured to check whether the second cover is detached from the rear surface of the housing by using the detection sensor, and transmit a stop command to the digitizer circuit, and the digitizer circuit may be configured to control the digitizer panel not to recognize the first signal in response to the stop command.

The second cover of the cover device may include a magnetic substance, and the detection sensor may include a Hall sensor that detects a change in a magnetic field.

The electronic device may further include a connection portion electrically connected to a cover connection portion of the cover device, wherein the processor may be configured to transmit a stop command to the digitizer circuit when the cover connection portion is connected to the connection portion, and wherein the digitizer circuit may be configured to control the digitizer panel not to recognize the first signal in response to the stop command.

A cover device according to an embodiment may include a first cover formed to cover the front surface of an electronic device; a second cover formed to cover the rear surface of the electronic device; a first folding part that foldably connects the first cover and the second cover; an input device disposed on the first cover; and a cover coil disposed on the first cover to generate a first signal when approaching the digitizer panel of the electronic device.

The cover coil may be disposed between the input device and the first folding part.

The cover device may further include a magnetic disposed on the second cover.

The cover device may further include a receiving portion that is formed to accommodate the pen input device and is disposed in the first folding part.

The second cover may include a first sub-cover foldably connected to the first cover through the first folding part, and a second sub-cover foldably connected to the first sub-cover through a second folding part.

The magnetic substance may be disposed on the second sub-cover of the second cover.

The cover device may further include a cover connection portion that is disposed on the first cover to enable the cover device to be electrically connected to a connection portion of the electronic device.

A method for controlling a display module including a digitizer panel according to an embodiment may include recognizing, by a digitizer circuit, a first signal generated as a first cover of a cover device including a cover coil approaches the digitizer panel; recognizing, by the digitizer circuit, a second signal generated as a pen input device approaches the digitizer panel; and controlling, by a processor, the display module in response to recognition of the first signal and the second signal.

Controlling the display module may be controlling, by the processor, the display module based on the strength of the first signal.

The first signal and the second signal may be signals having different frequencies.

The method may further include transmitting, by the processor, a confirmation command to the digitizer circuit by checking whether a second cover being foldably connected to the first cover of the cover device is attached through a detection sensor, wherein recognizing, by the digitizer circuit, a first signal may be executed based on the confirmation command.

The method may further include transmitting, by the processor, a stop command to the digitizer circuit by checking whether the second cover is detached through the detection sensor, wherein the digitizer circuit recognizes whether a first signal may be stopped based on the stop command.

The method may further include checking, by the processor, whether a connection portion and a cover connection portion of the cover device are electrically connected, and transmitting a stop command to the digitizer circuit in response to the cover connection portion being connected to the connection portion, wherein the digitizer circuit recognizes whether a first signal may be stopped based on the stop command.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:

a housing;

a sensor detecting a magnetic field;

a display disposed at the housing and comprising a display panel and a digitizer panel disposed under the display panel;

at least one processor operatively connected to the display; and memory storing one or more computer programs including computer-executable instructions that, when executed by the at least one processor, cause the electronic device to:

identify whether at least a portion of a cover device including a first cover and a second cover is attached to a rear surface of the housing using the sensor, transmit a confirmation command to the digitizer panel when at least a portion of the cover device is attached to the rear surface of the housing, control the digitizer panel to detect a first signal when the first cover including a coil approaches the digitizer panel, and control an operation of the display panel based on the detected first signal.

2. The electronic device of claim 1, wherein the at least one computer program further comprises computer-executable instructions that, when executed by the at least one processor, cause the electronic device to:

control the operation of the display based on a strength of the first signal.

3. The electronic device of claim 1, wherein the at least one computer program further comprises computer-executable instructions that, when executed by the at least one processor, cause the electronic device to:

identify an angle between the display and the first cover of the cover device based on a strength of the first signal, and control the operation of the display based on the identified angle.

4. The electronic device of claim 1, wherein the at least one computer program further comprises computer-executable instructions that, when executed by the at least one processor, cause the electronic device to:

control the digitizer panel to detect the first signal in response to the confirmation command.

5. The electronic device of claim 4, wherein the at least one computer program further comprises computer-executable instructions that, when executed by the at least one processor, cause the electronic device to:

identify whether at least a portion of the cover device is detached from the rear surface of the housing by using the sensor, transmit a stop command to the digitizer panel when at least a portion of the cover device is detached to the rear surface of the housing, and control the digitizer panel to stop detecting the first signal when the first cover including the coil moves away from the digitizer panel.

6. The electronic device of claim 4, wherein the second cover of the cover device includes a magnetic substance, and wherein the sensor includes a Hall sensor that detects a magnetic field.

7. The electronic device of claim 1, further comprising a connection portion connected to an electrical connection portion of the cover device, wherein the at least one computer program further comprises computer-executable instructions that, when executed by the at least one processor, cause the electronic device to:

transmit a stop command to the digitizer panel in response to identifying the electrical connection portion of the cover device is connected to the connection portion, and control digitizer panel to stop detecting the first signal when the first cover including the coil moves away from the digitizer panel.

8. The electronic device of claim 1, wherein at least one computer program further comprises computer-executable instructions that, when executed by the at least one processor, cause the electronic device to:

control the digitizer panel to detect a second signal when a pen input device approaches the digitizer panel, and control an operation of the display panel based on the detected second signal.

9. A cover device, comprising:
a first cover including a coil;
a second cover including a magnetic substance;
a first part foldably connecting the first cover to the second cover; and
an input device disposed at the first cover,
wherein the cover coil is used to generate a first signal when at least a portion of the cover device is attached to an electronic device and the first cover approaches a digitizer panel of the electronic device,
wherein the second cover includes a first sub-cover foldably connected to the first cover through the first part, second part and a second sub-cover foldably connected to the first sub-cover through a second part,
wherein the magnetic substance is disposed at the second sub-cover,
wherein the magnetic substance is detected by a sensor of the electronic device such that the electronic device identifies that at least a portion of the cover device is attached to a rear surface of the electronic device, and
wherein when the first sub-cover is detached from the rear surface of the electronic device, the second sub-cover is configured to be tilted with respect to the first sub-cover such that the cover device supports the electronic device with a specific angle.

10. The cover device of claim 9, wherein the cover coil is disposed between the input device and the first part.

11. The cover device of claim 9, wherein the first part includes a receiving portion accommodating a pen input device.

12. The cover device of claim 9, wherein the first cover includes an electrical connection portion connectable to a connection portion of the electronic device.

13. The cover device of claim 9, wherein the pen input device is used to generate a second signal when a pen input device approaches the digitizer panel.

14. A method of operating an electronic device comprising at least one processor and a display including a display panel and a digitizer panel, the method comprising:
identifying, by the at least one processor, whether at least a portion of a cover device including a first cover and a second cover is attached to a rear surface of a housing of the electronic device,
transmitting, by the at least one processor, a confirmation command to the digitizer panel in response to at least a portion of the cover device being attached to the rear surface of the housing,
controlling, by the at least one processor, the digitizer panel to detect a first signal executed based on the confirmation command when the first cover including a coil approaches the digitizer panel, and
controlling, by the at least one processor, an operation of the display panel based on the detected first signal.

15. The method of claim 14, wherein the at least one processor controls the display based on a strength of the first signal.

16. The method of claim 14, further comprising:
controlling, by the at least one processor, the digitizer panel to detect a second signal when a pen input device approaches the digitizer panel, and
controlling, by the at least one processor, an operation of the display panel based on the detected second signal.

17. The method of claim 16, wherein the first signal and the second signal have different frequencies.

18. The method of claim 14, further comprising transmitting, by the processor, a stop command to the digitizer panel by identifying whether the second cover is detached through the sensor,
wherein the digitizer panel recognizes whether the first signal is stopped based on the stop command.

19. The method of claim 14, further comprising:
identifying, by the at least one processor, whether a connection portion and an electrical connection portion of the cover device are electrically connected,
transmitting, by the at least one processor, a stop command to the digitizer panel in response to the electrical connection portion being connected to the connection portion, and
controlling, by the at least one processor, the digitizer panel to stop detecting a first signal based on the stop command.

* * * * *